(12) United States Patent
Wilson (10) Patent No.: US 8,381,640 B1
(45) Date of Patent: Feb. 26, 2013

(54) SPAETZLE PREPARATION APPARATUS

(75) Inventor: Mary Margaret Wilson, Champlin, MN (US)

(73) Assignee: Wiloreed LLC, Champlin, MN (US)

( * ) Notice: Subject to any disclaimer, the term of this patent is extended or adjusted under 35 U.S.C. 154(b) by 358 days.

(21) Appl. No.: 12/752,820

(22) Filed: Apr. 1, 2010

(51) Int. Cl.
  *A47J 27/00* (2006.01)
  *A47J 27/04* (2006.01)
  *A21C 3/04* (2006.01)

(52) U.S. Cl. ............ 99/444; 99/413; 210/464; 210/469; 425/382 R (58) Field of Classification Search ............ 99/413, 99/444, 450, 495; 220/574, 751, 759; 425/190, 425/204, 209, 382 R, 464; 210/464, 469
See application file for complete search history.

(56) References Cited

U.S. PATENT DOCUMENTS

| | | | |
|---|---|---|---|
| 1,801,065 A | | 4/1919 | Kunst |
| 2,404,130 A | * | 7/1946 | Frank ............................ 220/751 |
| 2,466,347 A | | 4/1949 | Ziemianin, Sr |
| 3,995,544 A | | 12/1976 | Farley |
| 4,383,813 A | | 5/1983 | Podell et al. |
| 4,420,298 A | | 12/1983 | Mandrick |
| 4,452,581 A | | 6/1984 | Panehal |
| 4,491,235 A | | 1/1985 | Fournier et al. |
| 4,563,946 A | | 1/1986 | Barlow et al. |
| D314,119 S | * | 1/1991 | Kauffman ...................... D7/505 |
| 5,089,284 A | | 2/1992 | Irvin et al. |
| 5,139,166 A | * | 8/1992 | Smith ............................ 220/574 |
| 5,324,185 A | | 6/1994 | Backus et al. |
| D359,202 S | | 6/1995 | Cousins et al. |
| 5,460,506 A | | 10/1995 | Price, IV et al. |
| D391,440 S | | 3/1998 | Cousins |
| D397,275 S | | 8/1998 | DuBay, Sr. et al. |
| 5,800,854 A | | 9/1998 | Jaeger |
| 5,902,481 A | * | 5/1999 | Schwietert ..................... 210/464 |
| 6,126,018 A | * | 10/2000 | Cone et al. ..................... 210/469 |
| D440,812 S | | 4/2001 | Clark |
| D457,787 S | | 5/2002 | Liu |
| 6,546,849 B1 | * | 4/2003 | Shimazaki ...................... 99/413 |
| 7,008,214 B2 | * | 3/2006 | Faddi ......................... 425/382 R |

(Continued)

FOREIGN PATENT DOCUMENTS

| | | |
|---|---|---|
| DE | 3113097 A1 | 10/1982 |
| DE | 4120391 A1 | 12/1992 |

OTHER PUBLICATIONS

Seven_Examples_of_Spaetzle_Makers_from_the_Internet.

*Primary Examiner* — Nini Legesse
(74) *Attorney, Agent, or Firm* — William R. Berggren; Berggren Law Offices, LLC (57) ABSTRACT

A pan for making spaetzle that has a shape, a rim, a depth, a collection of holes, a thickness and two handles that allows one to make spaetzle in a manner that is safer and easier than with currently known devices. The shape is a shallow circular shape with an overall curvature of a slice of a sphere. The rim has an open diameter of at least twenty centimeters and no more than twenty eight centimeters. The depth of the pan is from two to eight centimeters. A plurality of holes is located within a central pan portion that has a diameter of no more than 15.3 centimeters, the holes having a diameter of between six and thirteen millimeters. The thickness of the central pan region is not more than three millimeters and handles affixed to the rim each extend outward to a distance less than about five centimeters.

12 Claims, 3 Drawing Sheets

U.S. PATENT DOCUMENTS

| | | |
|---|---|---|
| D528,377 S | 9/2006 | Pippel et al. |
| D543,796 S * | 6/2007 | Lion et al. ............... D7/667 |
| D556,503 S * | 12/2007 | Holcomb et al. ......... D7/360 |
| D564,307 S * | 3/2008 | Repp ........................ D7/667 |
| D598,717 S | 8/2009 | Jalet |
| D640,512 S * | 6/2011 | Gorskey et al. ........... D7/665 |
| 2003/0217649 A1 * | 11/2003 | Leonori ..................... 99/495 |

* cited by examiner

SPAETZLE PREPARATION APPARATUS

FIELD OF THE INVENTION

This invention relates to the making of spaetzle, a noodle, also spelled in world literature as spaetzli, spaetzel, spaetzil, spatzle, spatzli, spatzel, spatzil, spetzle, spetzli, spetzel, and spetzil.

BACKGROUND OF THE INVENTION

There is a need for a versatile safe one-piece apparatus to make spaetzle that could be used with a variety of conventionally-sized pots with minimal mess.

Spaetzle has various spellings. Because of its long history and wide use in countries with various dominant languages, spaetzle can be found in world literature with a number of variations of spelling. These variations on spaetzle include spaetzli, spaetzel, spaetzil, spatzle, spatzli, spatzel, spatzil, spetzle, spetzli, spetzel, and spetzil. For consistency, the spelling "spaetzle" will be used throughout this document except where product names are mentioned that contain the word.

Spaetzle is an egg based noodle that is irregular in shape. It typically ranges in size from lump noodles of over 1.2 centimeters (½ inch) in diameter to rods with a length of between about 2.5 to 5 centimeters (one to two inches) and about and a diameter of about 6 to 9 millimeters (¼ to ⅜ inch).

Spaetzle has been known for a long time. While the geographic origin of spaetzle is unknown, written mention has been found in documents from as early as 1725. Today spaetzle, at lease in Europe, is generally associated with the German states of Baden-Württemberg and Bavaria. The leading German producer is Herrman, which produces approximately 13,000 tons per year. The estimated annual commercial production of spaetzle in Germany is approximately 40,000 tons, which does not include spaetzle made by individual households and restaurants. Premade spaetzle are also available internationally from companies such as Maggi, a division of Nestlé.

Spaetzle is used in many dishes. Spaetzle typically accompany meat dishes prepared with an abundant sauce or gravy. In Hungary spaetzle often are used in soup. Spaetzle also are used as a primary ingredient in some dishes.

Spaetzle is made commercially to be sold in stores or prepared by hand by cooks or homemakers. Commercially made noodles, marketed as spaetzle, may bear little resemblance to handmade spaetzle, being more or less regular in shape and having a more solid feel when eaten. Most popular are dried spaetzle that are cooked in boiling water like ordinary egg noodles. But as of late, pre-cooked spaetzle have become available as well in the supermarket refrigerators.

Preparation of homemade spaetzle is varied. Spaetzle dough typically consists of few ingredients, principally eggs, flour, and salt. A liquid, often water, milk or broth, is added to produce a thinner dough or batter. Traditionally, spaetzle are made by scraping dough off a wooden chopping board into boiling salt water where they cook until they rise to the surface. They are then skimmed and put aside. Since this can be a cumbersome way to prepare spaetzle, several devices were invented to facilitate cooking that resemble a strainer, (or colander), a potato ricer, a food mill or coarse grater. With the "strainer" type spaetzle maker, a thick batter is pushed through the holes using a spatula or the back of a spoon. Like with scraped spaetzle, the dough drops into the boiling water.

The above devices have problems. Some devices have multiple parts, are inefficient because they are time-consuming to clean and become unworkable if one part breaks. Other devices are dangerous because they are difficult to hold over scalding pots of water to urge dough to pass through holes and fall into the water. Single part devices are inflexible because they generally cannot be used easily with various sized water pots. Also, some devices with long handles are unsafe around children who may cause the device to tip over onto then. Still others are awkward to fill with dough or require multiple uses to make a desired amount of finished product.

There is still a need for an apparatus to make home-made spaetzle that is an efficient, safe, flexible device that is easier to use and clean than devices presently known.

SUMMARY OF THE INVENTION

I have invented an apparatus for preparing home-made spaetzle that is an efficient, safe, flexible device that is easy to use and clean. The invention is an apparatus for holding spaetzle dough as it is urged through holes into a container of boiling water to become spaetzle. My device comprises a pan with a bottom surface and a top surface. It has a shape, a rim, a depth, a collection of holes, a thickness and two handles that allows one to make spaetzle in a manner that is safer and easier than with currently known devices. The shape is a shallow circular shape with an overall curvature of a slice of a sphere. The rim has an open diameter of at least twenty centimeters and no more than twenty eight centimeters. The depth of the pan is from two to eight centimeters. A plurality of holes is located within a central pan portion that has a diameter of no more than 15.3 centimeters, the holes having a diameter of between six and thirteen millimeters. The thickness of the central pan region is not more than three millimeters. The handles for lifting the pan that is affixed to the rim and extending outward from the rim to a distance less than about two inches.

As used herein:

"Efficient" means the apparatus is a single piece that is easy to clean and store.

"Safe" means the apparatus has no handles protruding more than two inches from the rim of the pan portion.

"Flexible" means the apparatus fits on pots of boiling water with open diameters of from six inches to 11 inches without rocking in an unstable manner.

My invention offers several advantages in the preparation of spaetzle over those devices currently known. First, my invention is more efficient than multiple part devices that are time consuming to clean and are often useless if even one part breaks. Second, my invention is safer than those that are awkwardly large or have long handles that make the pan prone to tip and spill. Third, my invention is flexible in that is works for dropping formed dough in to containers of boiling water of a variety of sizes without spilling dough on the outside of the containers or on a source of heat such as an stove. These and other benefits will be apparent in the following discussion of some embodiments of my invention. Fourth, less energy is consumed because smaller pots can be used.

BRIEF DESCRIPTION OF THE DRAWINGS

One or more embodiments of the invention are described in the accompanying drawings. The drawings are briefly described below.

DETAILED DESCRIPTION OF SOME EMBODIMENTS OF THE INVENTION

The preparation of spaetzle is as follows. First spaetzle dough is made that typically consists of few ingredients, principally eggs, flour, and salt. This combination of ingredients is always thinned with a liquid such as water, milk or broth. One traditional method of determining the correct proportions of ingredients is to use as many eggs as there will be people served, plus one egg. To the eggs an equal volume of water or milk is added. Then gradually enough flour is added to reach the desired consistency. In addition to salt, spices such as nutmeg, dill, or caraway may be used, depending on what foods the spaetzle will accompany. For certain specialty dishes, the dough may be enriched with minced pork liver, spinach, or finely grated cheese.

The consistency is important. The desired consistency varies from soft, sticky dough to a thick batter. The consistency, and the method used to form the noodles, affects the resulting shape of the noodles. Common variants are small button or lump noodles, large thick noodles, and long thin noodles. All are more or less irregular.

Handmade spaetzle is generally made by homemakers and restaurant cooks seeking the irregular appearance of handmade spaetzle. Handmade spaetzle is formed by grating a lump of dough, scraping strips of dough from a cutting board or the rim of a bowl, by pushing the dough through a mechanical device. Handmade spaetzle are formed directly over a pot of boiling water (usually) or broth, into which they drop. These pots, also called stockpots, kettles and sauce pans, have open diameters that typically range from six inches to eleven inches and have depths that typically range from three inches to eleven inches. After boiling gently for about one to three minutes, the spaetzle rise to the surface; they are drained and usually served immediately.

To facilitate handmade spaetzle preparation, many devices have been developed. These devices fall into four broad categories, each with their own disadvantages. The spaetzle maker devices generally resemble a potato ricer, a food mill, coarse grater, or a strainer (or colander). Potato ricers are typically tiring to work with and wasteful because spaetzle dough is sticky, hard to clean, and results in a high amount of wasted dough. Food mills have multiple parts that are difficult to work with over a pot of boiling water, hard to clean and the device is unworkable if one part breaks. Graters are also hard to work with, messy, have a lot of wasted material, and hard to clean. Strainers or colanders are hard to work when using a variety of sized pots, have a lot of wasted material, and are often easily tipped when using over a pot of boiling water.

The following seven spaetzle preparation devices are examples of devices that are currently in commerce. I encountered problems with each device when using it to make spaetzle.

The first, a Spatzle Hex 'S' found at http://www.aaltonet.com/spaetzle.com, is a hopper arrangement that rests on the edge of a pot of boiling water and has a crank that is turned to press the dough through holes in the bottom and into the boiling water. I had three problems using it. First, multipart device is rendered useless if a part breaks or is lost. Second, the opening that one pours the traditionally sticky viscous batter is too small for rapid pouring and thus requires multiple deposits of batter that often result in batter pouring over the sides of the device in an uncontrolled manner. Third, a difficult cleanup situation arises that is also a hazard to the cook who tries to merely rinse in clean because multiple small parts must be disassembled to safely clean out all the egg containing batter.

The second device, a Premium Rotary Food Mill & Spaetzle Maker found at http://www.kitchenemporium.com, is an eight inch diameter hopper with a crank attached to a plate that presses dough through holes in a disc positioned at the bottom of the hopper. The device has a two quart capacity, comes with fine, medium and course sized discs and is apparently held over a pot of boiling water. This device has five problems. First, this multiple part manual tool protrudes down too far into smaller pots that typically have depths of between three and eight inches so that the batter becomes cooked blocking holes when the boiling water or broth comes in contact with the extrusion area of the device. Second, the balance of the device is more precarious on larger kettles since the handle must be held in one hand while the other hand turns the crank to keep the device from sliding too far and tipping into larger stockpots with diameters of between ten and eleven inches. Third, cleaning is complicated because the parts must be disassembled to properly clean. Fourth, the device is rendered useless if parts are lost because the device was not put together before storage. Fifth, the assembled device requires a large amount of irregular storage space.

The third, a sliding spaetzle maker or box spaetzle maker also known as a Spaetzle Maker by Villaware found at http://www.cooking.com/products/shprodde.as p?SKU=116227, consists of a 3.5 inch square hopper that is slid over a thirteen inch long slide that has five-sixteenth inch diameter holes. I encountered six problems. First, the device must be assembled to use unless stored while assembled in a space consuming manner. Second, the dough slides over the outer edges of the cooking pots boiling water creating a safety hazard when held over smaller kettles. Third, a safety hazard is created when held over large stock pots, such as those with diameters of nine inches or more, because one hand of the cook must balance the end tip precariously to keep it from falling into the boiling water while the other hand of the cook manually needs to push the box back and forth over an open pot of scalding water. Fourth, cleanup is time-consuming since the sticky two parts must be taken apart to clean. Fifth, the rolled edges of the metal form on the box portion create fine, microscopic cracks which can create health hazards if only casually cleaned.

The fourth device, a Spaetzle-Wonder Royal found at http://www.spaetzlewun der.de/index.php?newwpID=53715&MttgSession=8ee28, is a plastic pan with a flat bottom containing multiple holes with diameters suitable for making spaetzle and having a bottom diameter of less than 20 centimeters (7.9 inches), step-widening sides and two ear-like handles that result in an upper width of 28 centimeters (11 inches) and a length with handles of 38 centimeters (15 inches) so as to fit over the lips of pots with open diameters of from 20 centimeters (7.9 inches) to 30 centimeters (11.8 inches). This had two problems. First, the device was limited in usefulness because it had a flat bottom that could not fit over pans with smaller diameters than eight inches. Second, its stepped sides do not correlate with all standard pot diameters and caused it to sit in an unbalanced fashion on some kettles, especially the ones with a diameter smaller than 7.9 inches, and required the cook to grasp it tightly in one hand to stabilize the pan.

The fifth, a Kuchenprofi Spaetzle Lid found at http://www.germandeli.com/kspmas.html and similar to device four, is a stainless steel lid with a flat bottom containing a multiple holes with diameters of approximately 0.25 inches (6.4 millimeters) and having a bottom diameter of less than 20 centimeters (7.9 inches), step-widening sides and two small ear-like handles so as to fit within the open lips of pots with open diameters of from 20 centimeters (7.9 inches) to 26 centimeters (10.2 inches). This had two problems. First, the device was limited in usefulness because it had a flat bottom that could not fit over pans with smaller diameters than eight inches. Second, its stepped sides caused it to sit in an unbalanced fashion on some kettles, especially the ones with a diameter smaller than 7.9 inches, and required the cook to grasp it tightly in one hand to stabilize the pan if the stepped sides of the pan do not fit precisely into the pot.

The sixth, an Original Spaetzle-Maker from Kull found at http://www.loewen-urbach.de/swabian_spaetzle_maker.html, is a device similar to a potato masher and having a vertical hopper attached to one handle and with holes at the flat bottom of a diameter suitable for forming spaetzle, and a cylindrical disc slightly less in diameter than the vertical hopper attached to a second handle where pressing the handles together pushes spaetzle dough in the hopper through the holes. I encountered three problems with this device. First, this device had poor balance over all kettles, creating a safety hazard for the inexperienced cook. Second, the opening into which batter is poured is narrow and the sticky batter escaping over the top of the hopper floods over the sides creating a cleanup mess as well as a safety hazard; when the cook tries to reload the chamber, the sticky dough clings to the extruder circle of metal at the hopper bottom so that one has to take it out and set it down to get the chamber open to receive the next pour of batter. Third, the device only takes a small amount of batter at one time, causing the cook to take more time and effort to create the spaetzle.

The seventh, a Nana's Pasta Maker found at http://www.cookingwithnana.com/, is a flat bottomed pan with a height of 5 centimeters (2 inches), a top and bottom diameter of 20 centimeters (7.9 inches), a base thickness of over 3.5 millimeters (0.14 inch), parallel rows of troughs along the bottom from side to side, and holes dispersed along the troughs up to then outer edge with diameters suitable for making spaetzle, and a handle extending horizontally outward about 19 centimeters (7.5 inches) from the bottom of the pan. This has five problems. First, it is very clumsy to use due to unbalanced handle, which protrudes far out and presents a safety hazard of tipping. Second, when the device is placed on an average pot of between six and eight inches open-diameter, the batter pours out and down the sides of the pot and onto the stove top to create a fire and safety hazard as well as a difficult clean-up for the cook who tries to use it on a traditional six, seven or eight inch pot. Third, it cannot be balanced on the larger more common nine, ten and eleven inch stockpots due to the outer diameter that is less than the open diameter of the larger kettles. Fourth, Because of the thickness of the bottom, the holes function as tubes that make it more difficult to clean thoroughly and keep sanitary. Fifth, the seventeen inch length, comprised of a pan width of almost 10 inches and handle of about 7.5 inches, and a height of over five centimeters (two inches) result in a size that takes up a large amount of storage space make storage.

After much experimentation, I have invented a spaetzle maker that is more efficient, less messy, more flexible, and safer than the devices currently known. Specifically I have invented a pan that has a shape, a rim, a depth, a collection of holes, and a thickness that allows one to make spaetzle in a manner that is safer and easier than with currently known devices. The shape is a shallow circular shape with an overall curvature of a slice of a sphere. The rim has an open diameter of at least twenty centimeters (about 7.9 inches) and no more than twenty eight centimeters (about 11 inches). The depth of the pan is from two to eight centimeters. A plurality of holes is located within a central pan portion that has a diameter of less than 15.3 centimeters (about 6 inches), the holes having a diameter of between six and thirteen millimeters. The thickness of the central pan region is up to two millimeters. The handles for lifting the pan are affixed to the rim and extend outward from the rim to a distance less than about 2 inches.

The shape is a shallow circular shape with an overall curvature of a slice of a sphere. Because of the shallow circular shape of the pan, it is able to stably rest on a pots having a variety of open diameters without being too low so as to allow the spaetzle dough to adversely contact the boiling water before it leaves the holes in the pan.

The rim has an open diameter of at least twenty centimeters and no more than twenty eight centimeters. This, together with holes concentrated in an area with a diameter of less than about 15.3 centimeters (about 6 inches), allows the pan to rest just its pan surface on conventionally-sized pots with open diameters of about 15.3 centimeters (six inches) to about twenty-eight centimeters (eleven inches). Handles, discussed below, extend the useable pots to those of even wider diameters.

The depth of the pan is from two to eight centimeters. Depending on the open width of the pan, the depth may range from two to eight centimeters. This corresponds to a volume of between about 0.5 liters (about two cups and about 2.0 liters (about eight and one-half cups). Thus my apparatus holds enough spaetzle dough to make a meal for a family of between two and at least eight people. A plurality of holes is located within a central pan portion that has a diameter of no more than 15.3 centimeters (six inches), the holes having a diameter of between six and thirteen millimeters. Standard pots have diameters of between about 15.3 centimeters (six inches) and twenty-eight centimeters (eleven inches). Spillage of dough on the outside of the pots is minimized with use of my pan because the center portion containing the holes does not have a diameter of over the open diameter of the smallest standard pot. Spaetzle noodles generally have diameters of between six millimeters (one-fourth inch) up to thirteen millimeters (one-half inch). More commonly, the noodle diameter ranges from between six millimeters (one-fourth inch) to about ten millimeters (three-eight inch). The holes of my pan are intended to make noodles of the size more commonly associated with spaetzle.

The material used to make the apparatus is one that is safe around food and able to withstand temperatures associated with cooking spaetzle, i.e. up to 200 degrees. This includes metals, metal foils and plastics. The metals, metal foils, and plastics are those approved by the United States Food and Drug Administration (USFDA). Suitable metals or metal foils include, for example, 304 stainless steel, 316 stainless steel, aluminum, and aluminum foil. Suitable plastics include, for example, nylon 6, nylon 6, 6, and glass reinforced nylon. In addition, nominally non-stick coatings or surface treatments may be used that are commonly available on cookware, such as, for example, TEFLON®.

The thickness of the central pan region is not more than three millimeters and depends on the material used. The thickness of the central pan portion should be enough to provide the pan with dimensional stability during the rigors of cooking and minimize the burden of cleaning. Thicknesses less than two millimeters significantly reduce the difficulty of cleaning the holes after use. Some embodiments of my invention are made from metal. These embodiments have central pan portion thicknesses of typically between about 0.6 millimeter (about 0.02 inch) and about two millimeters (about 0.079 inch). Some embodiments, made to be disposable, are made of metal foil similar to that used to make pie pan. Some such embodiments have central pan portion thicknesses of from about 0.07 millimeter (about 0.0028 inch) to about 0.6 millimeter (about 0.02 inch). Other such embodiments have central pan portion thicknesses of from about 0.07 millimeter (about 0.0028 inch) to about 0.2 millimeter (about 0.0078 inch). Some embodiments are made of plastic. Such embodiments have central pan portion thicknesses of over 2 millimeters to obtain dimensional stability during use and cleaning. Some such embodiments have central pan portion thicknesses of less than two millimeters when made with filler reinforcement such as glass reinforced nylon. These embodiments typically have the lighter weight of plastics but the easy of cleaning of metal.

In addition, some embodiments have two handles affixed to the rim and opposing each other. The handles may have a variety of shapes such as, for example, semi-circular, rectangular or other shapes. The handles are either turned down or extend horizontally outward for easy gripping. Some embodiments have handles that have openings in them to make gripping them even more comfortable. For ergonomic reasons some embodiments have handles that both curve downward and have openings. This construction is particularly easy to handle under cooking and cleaning conditions.

The handles do not extend more than about 5 centimeters (two inches) outward from the pan rim. This not only makes the pans safe to handle and easy to store, the pans are able to be placed securely on pots with open diameters of up to 10 centimeters (four inches) beyond diameter of the rim of the pan.

Some embodiments also have one support ring surrounding the central pan portion with a depth and a thickness. This is to allow the pan to securely fit within pots having open diameters of about 15.3 centimeters (about six inches) to securely fit within those pans even when the pan itself has a much larger open diameter. Thus small sauce pans can be used to provide boiling water with corresponding less use of energy. The depth of the support ring is enough to provide stability in the small pot and minimal side-to side movement of the pan when set upon a counter. Depths may range from less than the depth reached by the center of the curved bottom portion of the pan to slightly more. Typical depths range from less than six millimeters (one-fourth inch) to more than twenty-five millimeters (one inch). The thickness is sufficient to remain dimensionally stable with use and cleaning. A typical thickness may range from about 0.6 millimeter (about 0.02 inch) and over six millimeters (one-eighth inch)

Some embodiments have at least two approximately vertical protrusions extending downward from the bottom of the pan. The protrusions are symmetrically positioned on an imaginary circle encompassing the central pan portion that contains the multitude of holes. In some embodiments the circle has a diameter of about 20 centimeters (7.9 inches) and the protrusions fit within the opening of a standard pot with an open diameter of about 15.2 centimeters (six inches). They provide a more secure anchor of the pan to the pot to minimize spillage and increase ease of handling for the cook. In some embodiments the protrusions are placed on the pan bottom to fit into the open diameters of pots of different sizes.

The protrusions have a shape that permits them to more securely hold the pan on top of a small pot. Some protrusions may be like inverted cones with rounded tips. Others may be rod like or similar to square shaped rectangles. Still others may be curved. Any shape is suitable as long as it is able to perform at least one of two functions, i.e., (1) allowing the pan to rest with more stability on top of a small pot than a pan without protrusions and (2) permitting the pan to rest on a counter with more stability than a pan without protrusions.

Figure 1:
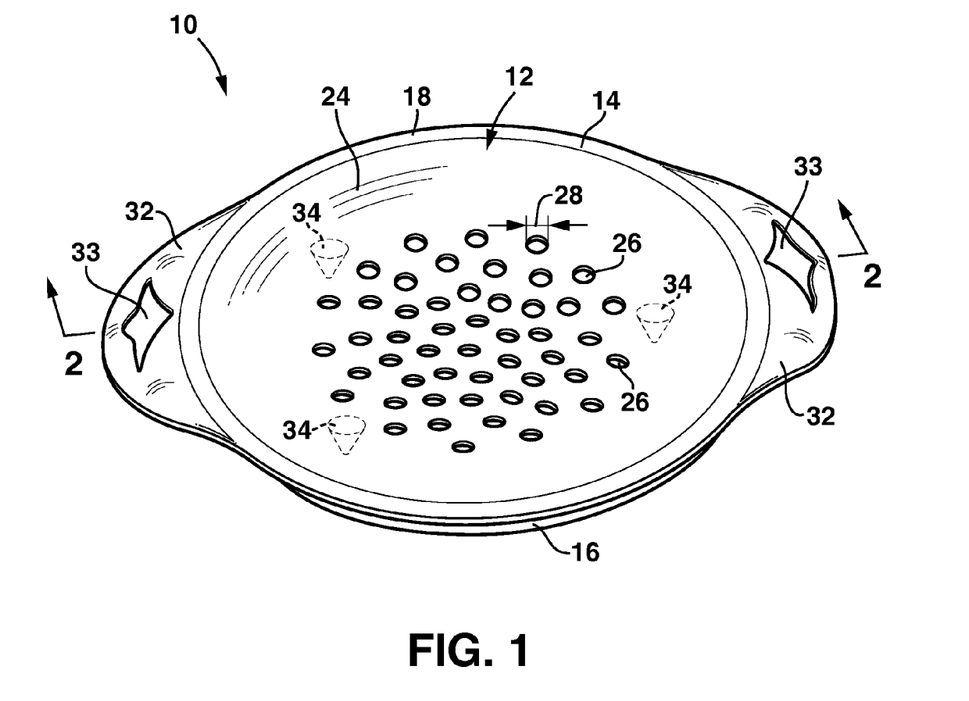
FIG. 1 is a perspective view of an embodiment of the invention from an upper front point of view.
Figure 2:
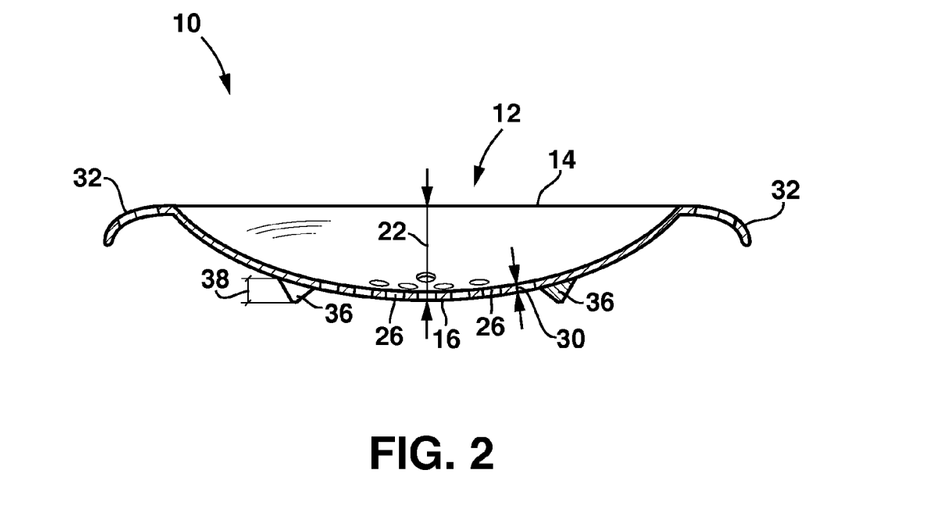
FIG. 2 is a side view of the embodiment of the invention shown in FIG. 1.
Figure 3:
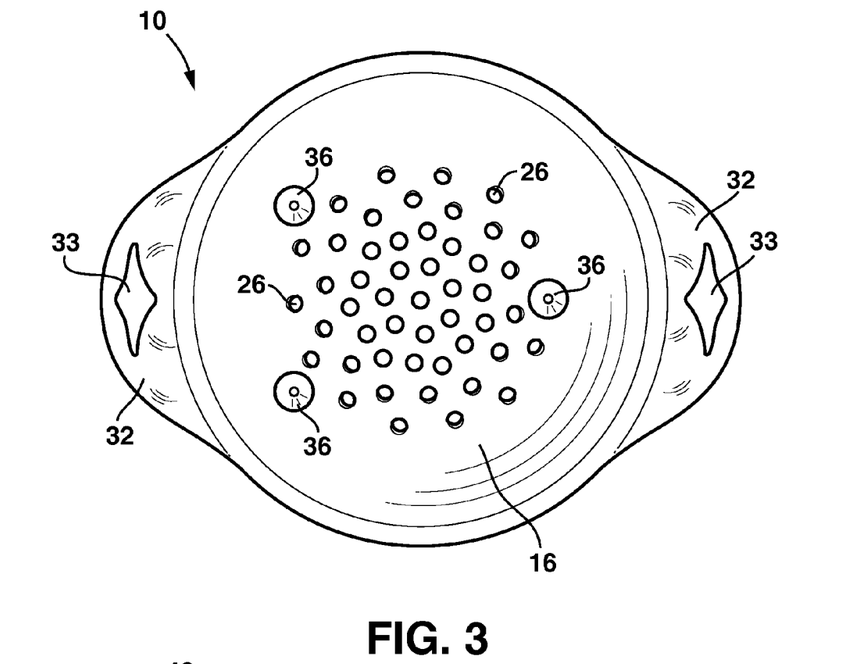
FIG. 3 is a bottom view of the embodiment of the invention shown in FIG. 1.

In other embodiments, the apparatus has three or more protrusions that are equally distanced around the multitude of holes along a circle that encompasses the holes. In some embodiments, the protrusions extend below a horizontal plane that touches the bottom of the pan so that the pan is able to rest on a counter upon its protrusions. Other embodiments have protrusions that extend to the horizontal plane that touches the bottom of the pan so that the pan may rest on a counter upon the protrusions and the pan bottom. Still other embodiments have protrusions that extend to a distance that is short of the bottom of the pan so that the pan may rest on a counter upon the pan bottom and two of the three protrusions Two embodiments are illustrated in the following figures. The same numbers are used to denote the same elements in the figures. One embodiment is illustrated in FIGS. 1-3. FIG. 1 is a perspective view of an embodiment of the invention from an upper central point of view. FIG. 2 is a top view of an embodiment of the invention shown in FIG. 1 and FIG. 3 is a bottom view of the embodiment. The apparatus (10) includes a pan (12) with a top (14), a bottom (16) and a rim (18). Pan 12 has an open diameter (20) and a depth (22). The central pan portion (24) has a multitude of holes (26), each with a diameter (28) and a depth (30). Apparatus 10 also includes two handles (32) attached to rim 18 on opposing sides of pan 12. Each handle extends outward from rim 18 before curving downward and each has a hole (33) in the handle. Pan 12 also has three inverted cone-shaped protrusions (34) attached to pan bottom 16 in a circular attachment (32) equally distanced from each other along the outer boundary of the region containing multitude of holes 26 so as to be able to fit within a pot (not shown) with an open diameter of about 15.2 centimeters (six inches). Each protrusion 34 has a height (38) that together extend to below the bottom of the pan so that the pan is able to rest on a counter upon its protrusions.

Figure 4:
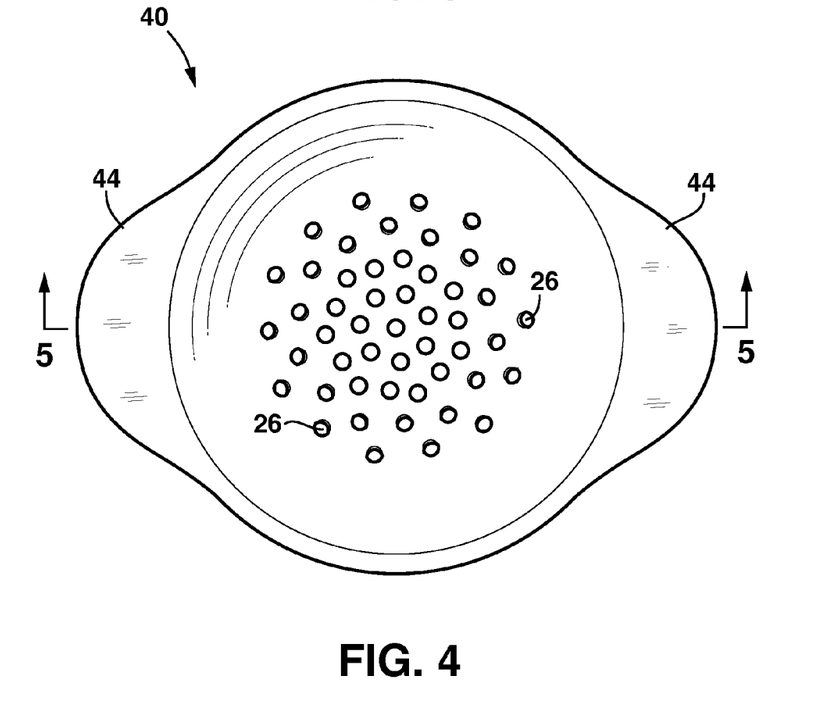
FIG. 4 is a top view of an embodiment of the invention.
Figure 5:
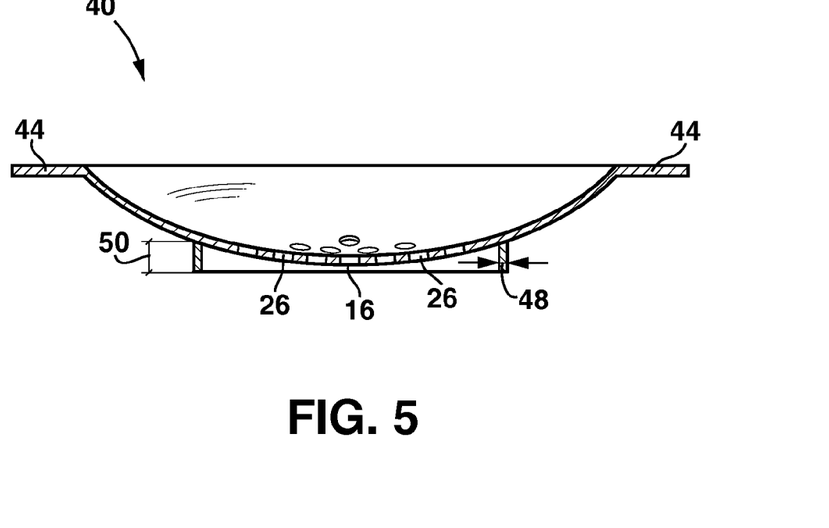
FIG. 5 is a side view of the embodiment of the invention shown in FIG. 4.
Figure 6:
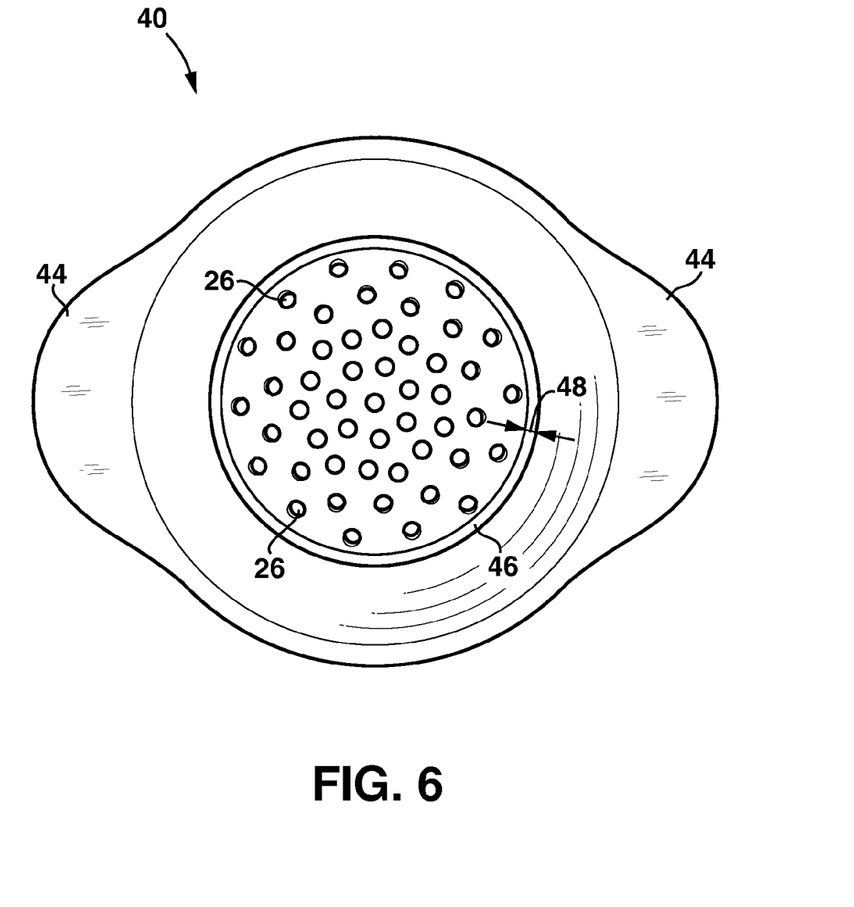
FIG. 6 is a bottom view of the embodiment of the invention shown in FIG. 4.

Another embodiment is illustrated in FIGS. 4-6. FIG. 4 is a top view of the embodiment of the invention from an upper central point of view. FIG. 2 is a side view of the embodiment of the invention shown in FIG. 4 and FIG. 6 is a bottom view of the embodiment. The apparatus (40) includes a pan (12) with a top (14), a bottom (16) and a rim (18). Pan 12 has an open diameter (20) and a depth (22). The central pan portion (24) has a multitude of holes (26), each with a diameter (28) and a depth (30). Apparatus 10 also includes two handles (44) attached to rim 18 on opposing sides of pan 12. Each handle extends outward from rim 18. Pan 12 also has a support ring (46) attached to pan bottom 16 along a circle that encompasses multitude of holes 26 and is able to fit within the open diameter of a six inch pot (not shown). Support ring 46 has a thickness (48) and a height (50) so that the pan is able to rest on a counter upon its support ring.

The apparatus can be made from a variety of materials. Some embodiments are permanent and made dishwasher stable and the United States Food and Drug Administration (FDA) approved materials. These include stainless steel and well known plastics. Other embodiments are disposable and made from FDA approved materials such as thick tin foil used to make pie plates.

My device offers unique features and improvement upon all prior art both in America as well as overseas and Canada. Ten advantages stand out.

First, my apparatus is more stable to use. Because of its gentle spherical curve-like bottom it seats securely on both large and small kettles that range from commercial stockpots up to eleven inches in diameter to small six inch pots. By looking at the popular Spaetzle-Wonder Royal and the Kuchenprofi Spaetzle Lid as well as Nana's Pasta maker one can see that a tipping hazard arises when an attempt is made to place these on smaller kettles.

Second, my apparatus is easier to clean, store and keep sanitized. Experienced cooks know multiple parts in cooking gadgets complicate cleanup, storage, and sanitation. When a piece is lost the gadget is worthless. My device is smooth and of one piece so that it does not have multiple parts such as the Spaetzle Hex, the Premium Rotary Food Mill and Spaetzle Maker, the Spaetzle Maker by Villaware, and the Kull Spaetzle-Maker. My apparatus also lacks the slightly more difficult to clean ridges on Nana's Pasta Maker.

Third, my invention is safer to use. It is much safer than other models because it does not need to be hand held over scalding water or broth like the popular Spaetzle Maker by Villaware and balances perfectly on all kettles. With one hand the cook can use a spatula to help the batter rapidly go through the holes that are centered over the central portion of the bottom with its six inch diameter.

Fourth, my device is not dangerous around children. It does not have a dangerous long handle that a child could pull down from a stove top like some models such as Nana's Pasta Maker.

Fifth, mine is easier to load. It is much easier to load with batter than Spaetzle Hex or Spaetzle Maker by Villaware. In some embodiments, the cook has up to an 11" opening to simply pour batter from the mixing bowl rather than spooning it into the inconveniently small openings in most others which drip down the sides and become a mess. In others the opening is as small as 7.9 inches but is still easy to pour batter into because of the shallow depth of my pan Sixth, my apparatus has a suitable capacity. It holds up to four cups of batter, far more than all of the devices mentioned above except the multipart Premium Rotary Food Mill. It also holds the batter neatly in its spherical bottom in such a way that prevents spill over when extruding the batter into the boiling liquid. Even the Spaetzle-Wonder Royal device when used with kettles eight inches or larger can have batter escape from it and pour down onto the open range and down the outsides of the cook's kettle when the handles rest on the lip of the kettle.

Seventh, my device minimizes clumping. Its gentle spherical bottom has perforations on only the center portion with a diameter of about 6 inches. The multitude of holes at the bottom let the spaetzle dough fall in such a way that the strands do not clump into larger unappetizing lumps that do not cook evenly. Cook's are often told they can use a colander but colanders have a much steeper edge and batter oozes through these to flow down the outside toward the center into larger clumps with all pots as well as flowing over the sides onto the stove when used with smaller pots.

Eighth, embodiments of my invention are even more stable when used with small pots. Some embodiments have circular support rings up to 12 millimeters (0.5 inch) high that encircle the central portion region of the bottom and fit within the top of a smaller pot such as six of seven inch pot. Other embodiments have protrusions that extend downward from 1.4 to up to 25 millimeters (one inch) from the edge of the imaginary circle encompassing the central portion that similarly fit within the top opening of small pots. The added stability increases a cooks safety and ease of cooking around scalding water.

Ninth, my invention has ergonomically superior handling. In this embodiment, the symmetrically placed small handles curve down or extend out giving the pan an ergonomic advantage to the cook when picking it up and setting it down. These handles help balance on larger kettles. Also they are easy to pick up when working fast or when hot and they fit into a hand more comfortably with less risk of dropping the hot pan onto the stove or floor.

Tenth, some embodiments are disposable. My apparatus can be made from a variety of materials from traditional dishwasher stable stainless steel and FDA approved plastic to disposable materials such as thick tin foil pie plate like materials.

Other embodiments will be apparent to those skilled in the art. This document is meant to include all embodiments that encompass the spirit and purpose of the invention and include the required elements.

I claim:

1. An apparatus for preparing spaetzle noodles from spaetzle dough, comprising,
a pan having a bottom surface and a top surface, a shallow circular shape with an overall curvature of a thin slice of a sphere, a rim with an open diameter of no more than twenty eight centimeters (11 inches) to permit placement on the tops of pots of boiling water having an open diameter ranging from 15.3 centimeters (six inches) to 25.4 centimeters (10 inches), a depth of from about two centimeters (0.8 inches) to about eight centimeters (3.1 inches) to minimize the chance of any of the pan touching the water so as to prevent premature contact of uncooked spaetzle dough with boiling water before it is formed into spaetzle noodles, a central pan portion having a diameter of no more than 15.3 centimeters (6 inches) to eliminate spillage of dough outside the pots containing a plurality of holes where the holes have a diameter of between about six millimeters (¼ inch) and about thirteen millimeters ½ inch) to minimize plugging of holes during cooking and cleaning afterwards and depths of not more than about three millimeters (⅜ inch) to minimize plugging of holes during cooking and cleaning afterwards and handles for lifting the pan where each is affixed to the rim and extends outward from the rim to a distance less than about five centimeters (2 inches) to minimize chance of accidentally knocking the pan during cooking and causing spills.

2. The apparatus of claim 1 wherein the means is two handles affixed to the rim of the pan, each on opposite sides of the rim.

3. The apparatus of claim 1 wherein the thickness of the central bottom portion is less than two millimeters.

4. The apparatus of claim 1 wherein the pan is made of a material from the group consisting of food grade United States Food and Drug Administration (USFDA) approved durable metal and USFDA approved to 200 degrees Celsius plastic.

5. The apparatus of claim 4 wherein the metal is form the group consisting of 304 stainless steel, 316 stainless steel, aluminum, and aluminum foil, and the plastic is from a group consisting of nylon 6, nylon 6, 6, and glass reinforced nylon.

6. The apparatus of claim 1 wherein the pan is further coated with a nominally non-stick material.

7. The apparatus of claim 1 wherein the pan, further comprises, at least one support ring affixed to the bottom of the pan, encircling the multiple holes and with a suitable diameter to fit within the opened top of a first standard container for heating water, wherein the container has an open diameter.

8. The apparatus of claim 7 wherein the container is a pot, stockpot, kettle or sauce pan.

9. The apparatus of claim 7 wherein the pan and support ring have a unified one piece form with a smooth top and bottom surface.

10. The apparatus of claim 1 wherein the pan, further comprises, at least two protrusions extending downward from the bottom of the pan and affixed to the bottom of the central pan portion symmetrically along an imaginary circle encompassing the multitude of holes.

11. The apparatus of claim 10 wherein the imaginary circle has a diameter sufficient to enable the protrusions to fit just inside the top of a six-inch sauce pan.

12. The apparatus of claim 1 where in the rim has a diameter of at least twenty centimeters (7.9 inches) to fit over a pot with an open diameter of about 6 inches.

* * * * *